June 11, 1968

C. JAGGERS 3,387,785

LAWN SPRINKLING APPARATUS AND SYSTEMS

Filed June 29, 1966

INVENTOR
*Clifford Jaggers*
BY
*Wofford & Felsman*
ATTORNEYS 3,387,785
LAWN SPRINKLING APPARATUS
AND SYSTEMS
Clifford Jaggers, 3959 Angus Drive,
Fort Worth, Tex. 76116
Filed June 29, 1966, Ser. No. 561,439
4 Claims. (Cl. 239—200)

ABSTRACT OF THE DISCLOSURE

Following is disclosed apparatus for irrigation consisting of a tubular housing which encloses a slotted sprinkler pedestal receiver that receives a sprinkler pedestal to position a sprinkler head. The geometric relationship between sprinkler pedestal and the pedestal receiver prevents unintentional movement of the pedestal. Onto an upper portion of the pedestal is secured a connection means having a threaded collar to receive a conduit such as a garden hose and a threaded portion to receive the sprinkler head.

---

Previously known lawn sprinkling systems may be divided into two broad categories: (1) systems which include the steps of randomly moving one or more lawn sprinklers from region to region on a lawn; and (2) systems which comprise the installation of permanent sprinklers and underground water conduits.

One disadvantage of lawn sprinkling system (1) above is the difficulty in distributing water evenly over the lawn. Large amounts of time and effort may be expended in determining where the sprinklers should be placed to attain even water distribution. Therefore, the sprinkling of large lawns, or even surprisingly small lawns, can be extremely troublesome and time consuming and, irrespective of all the amount of time spent, it is difficult to obtain uniform distribution over the surface of the lawn.

One of the disadvantages of the permanent sprinkler system (2) above is the large installation expense. Ditches must be dug between the various selected sprinkler locations, expensive rust-resistant conduits installed, the ditches filled with dirt, and then grass planted over the resulting unsightly areas. Therefore, in addition to large initial expense, the beauty of the lawn is marred for a period of time. The principal advantage of permanent sprinkler systems, however, is that more uniform distribution of water is obtained.

I conceived and subsequently developed a lawn sprinkling system which combines the even water distribution advantage of permanent sprinkler systems with economy of installation not far removed from that found in the systems wherein conventional portable sprinklers are randomly moved from time to time across a lawn.

It is, accordingly, an object of my invention to provide an improved lawn sprinkling system and apparatus therefor.

Another object of my invention is to provide a lawn sprinkling system which may be installed with greater economy than the previously known permanent water sprinkler systems but which produces greater uniformity of water distribution than the method of randomly moving a portable sprinkler from location to location.

Another object of my invention is to provide improved apparatus for removably securing sprinkler heads in selected predetermined positions.

These and other objects are effected by my invention as will be apparent from the following description taken in accordance with the accompanying drawing, forming a part of this application, in which.

Figure 1:
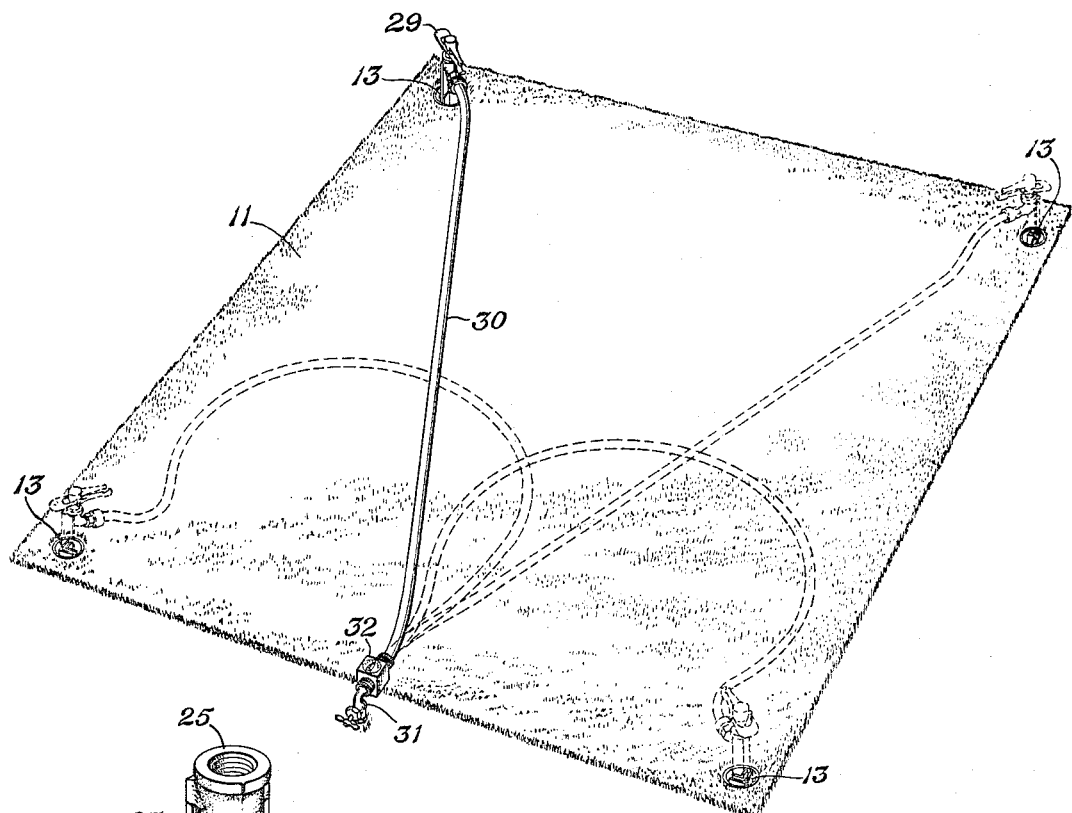
FIG. 1 is a perspective view showing a region of a lawn having installed therein a lawn sprinkling system constructed in accordance with the principles of my invention.
Figure 2:
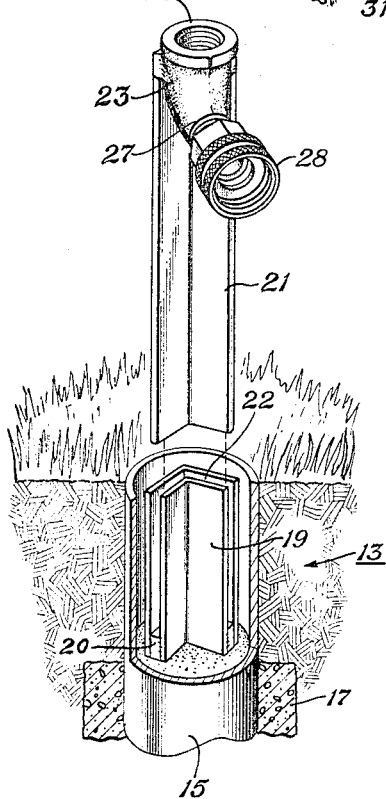
FIG. 2 is a perspective view of mounting apparatus that may be used in conjunction with the system shown in FIG. 1.

Referring initially to FIG. 1 of the drawing, the numeral 11 designates a selected geographical region in a lawn which is to be irrigated. A plurality of positioner means 13 are selectively arranged on region 11 to obtain the most uniform possible water distribution. The positioner means in this instance includes a tubular housing 15 which is inserted in a substantially vertical position in the earth and retained therein preferably by pouring concrete 17 around the lower portion thereof, as is shown in FIG. 2. The cement 17 extends into an interior portion of the housing 15 and vertically supports a slotted sprinkler pedestal receiver 19. The pedestal receiver 19 may be formed of two pieces of angle iron which are welded to a spacer 20 positioned therebetween.

A sprinkler pedestal 21, also formed of a piece of angle iron in this instance, may be inserted into the slot 22 of the pedestal receiver 19.

A connection means 23 is secured by suitable means such as welding to an upper region of the sprinkler pedestal 21, having one end portion 25 adapted to receive a sprinkler head and another end portion 27 adapted to removably receive the coupling of a conventional garden hose 30. End portion 25 is internally threaded as shown to receive the male threaded connection member (not shown) of one of the sprinkler heads 29 of FIG. 1. The other end portion 27 is threaded to receive a conventional rotatable and threaded collar 28 that receives the threaded end portion of the garden hose 30, which communicates with the faucet 31 of source of water and preferably with a timer valve 32.

In operation of my system, the sprinkler head 29, being first attached to the threaded end portion 25 of the connection means 23 supported by the sprinkler pedestal 21, is carried to a selected positioning means 13. A coupling of hose 30 is secured to the collar 28 attached to end portion 27 of connection means 23. The opposite end of the hose is attached to faucet 31, which may be thereafter turned to a position to permit the flow of water to the sprinkler head. The sprinkler pedestal 21 is inserted in the slot 22 of the pedestal receiver 19 and thereby held against radial or pivotal movement. Since the sprinkler heads depicted in the drawing are of the type which rotate sequentially around a vertical axis, the positioner means 13, the pedestal receiver 19, and the sprinkler pedestal 21 cooperate to prevent movement of the sprinkler head, except that movement intentionally permitted by the sprinkler head mechanism itself.

After the portion of the lawn in proximity with the spray of water from the sprinkler head 29 in its initial position has received a satisfactory amount of water through proper setting of timer-valve 32, then the sprinkler head is moved to another positioner means 13 and eventually to another, until all positioner means have been used. Thus, the entire region 11 of the lawn may be systematically sprinkled with uniform water distribution.

It should be apparent from the foregoing that I have provided an invention having significant advantages.

The expense of permanently installed water sprinkling systems is avoided by eliminating the necessity for digging ditches across region 11 of the lawn; and by eliminating the necessity for laying expensive and rust resistant line pipes in the ditches. Greater flexibility in water distribution is possible as compared with permanent water sprinkling systems, since it is possible to water only one selected portion of the region 11 if desired.

While I have shown my invention in only one form, it should be apparent to those skilled in the art that it is not so limited but is susceptible of various changes and modifications without departing from the spirit thereof. The sprinkler pedestal may be permanently attached to the positioning means, for example, and a plurality of sprinkler heads secured in fixed positions in the lawn. There are a variety of geometric forms of positioning means, sprinkler pedestals, connection means and sprinkler heads that may be used with my invention. Thus, my invention is not limited to the form shown in the drawing or described above.

I claim:

1. Lawn sprinkler apparatus comprising a tubular housing adapted to be secured to the ground at a selected location; a slotted pedestal receiver disposed in said tubular housing, said receiver having vertically disposed surfaces defining its slotted portion, two of such surfaces being parallel and mutually opposed to intersect two additional mutually opposed parallel surfaces; a sprinkler pedestal adapted to extend into and mate with the slotted portion of said pedestal receiver, thereby preventing radial movement of said pedestal; connection means rigidly secured to an upper region of said sprinkler pedestal and having one end portion adapted to receive a sprinkler head and another end portion adapted to receive the coupling of a water hose.

2. The apparatus defined by claim 1 in which said pedestal receiver comprises a first pair of intersecting rigid plates; a second pair of intersecting plates opposed to said first set of plates; and a rigid spacer secured between said first and second pair of plates to rigidly establish the distance therebetween.

3. Lawn sprinkler apparatus comprising a tubular housing adapted to be secured to the ground at a selected location; a slotted pedestal receiver insertable into said tubular housing, said receiver having vertically disposed surfaces defining its slotted portion, two of such surfaces being parallel and mutually opposed to intersect two additional mutually opposed parallel surfaces; a sprinkler pedestal adapted to extend into and mate with the slotted portion with said pedestal receiver, thereby preventing radial movement of said pedestal; connection means rigidly secured to an upper region of said sprinkler pedestal and having one end portion adapted to receive a sprinkler head and another end portion adapted to receive the coupling of a water hose; a sprinkler head secured to said sprinkler pedestal to spread water over a selected geographical area when said hose is secured to said connection means and water forced therethrough.

4. The apparatus defined by claim 3 in which said pedestal receiver comprises a first pair of intersecting rigid plates, a second pair of intersecting plates opposed to said first set of plates; and a rigid spacer secured between said first and second pair of plates to rigidly establish the distance therebetween.

References Cited

UNITED STATES PATENTS

| | | | |
|---|---|---|---|
| 3,003,514 | 10/1961 | Furlong | 137—624.18 X |
| 3,193,205 | 7/1965 | Hanson | 239—201 X |

FOREIGN PATENTS 571,085   2/1933   Germany.

M. HENSON WOOD, JR., *Primary Examiner.*

H. NATTER, *Assistant Examiner.*